US012641082B2

(12) United States Patent
Dreas et al.

(10) Patent No.: US 12,641,082 B2
(45) Date of Patent: May 26, 2026

(54) OWNERSHIP IDENTIFICATION FOR UNASSIGNED NETWORK DEVICES

(71) Applicant: Charter Communications Operating, LLC, St. Louis, MO (US)

(72) Inventors: Eric Paul Dreas, Aurora, CO (US); James Russell Boelter, Englewood, CO (US); John Charles David Morris, Evanston, IL (US); Marc Richard Dostie, Red Bank, NJ (US); Matthew George Grocock, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 140 days.

(21) Appl. No.: 18/768,661

(22) Filed: Jul. 10, 2024

(65) Prior Publication Data

US 2026/0019420 A1     Jan. 15, 2026

(51) Int. Cl.
*H04L 29/06*          (2006.01)
*H04L 9/40*           (2022.01)

(52) U.S. Cl.
CPC ................................ *H04L 63/0876* (2013.01)

(58) Field of Classification Search
None
See application file for complete search history.

(56) References Cited

U.S. PATENT DOCUMENTS

| 9,027,135 | B1 * | 5/2015 | Aziz | ..................... | G06F 21/554 |
| | | | | | 726/23 |
| 2021/0058421 | A1 * | 2/2021 | Dahlberg | .............. | G06F 16/288 |
| 2025/0286899 | A1 * | 9/2025 | Shriver | ............... | H04L 63/1416 |

* cited by examiner

*Primary Examiner* — Natisha D Cox

(74) *Attorney, Agent, or Firm* — Dority & Manning, P.A.

(57)          ABSTRACT

Candidate data items can be identified from a plurality of data items of one or more datasets, wherein the one or more datasets are associated with one or more network devices comprising an unassigned network device that is unassigned to any network owner entity, and wherein each of the candidate data items is associated with the unassigned network device. The candidate data items can be evaluated with ownership identification rules to generate an ownership identifying output, wherein the ownership identifying output includes information indicative of a predicted network owner entity for the unassigned network device and a confidence value corresponding to the predicted network owner entity. Based on the confidence value, a determination is caused to be made whether to assign the unassigned network device to the predicted network owner entity.

20 Claims, 4 Drawing Sheets

OWNERSHIP IDENTIFICATION FOR UNASSIGNED NETWORK DEVICES

BACKGROUND

Internet Protocol (IP)-based networks are implemented with a wide variety of network devices, such as network infrastructure devices (e.g., network routers, network switches, etc.), user devices (e.g., smartphones, laptops, etc.), user premises equipment (e.g., user routers, modems, etc.). In some instances, network devices within a IP-based network can be subject to security threats (e.g., remote code execution, data extraction, etc.). Once a security threat is detected, the threat can be mitigated by the entity that "owns" the network device (e.g., manufactures the device, is assigned to the device, etc.). For example, assume that a network service provider utilizes an infrastructure device that is owned by a third-party service provider (e.g., a satellite, a base station, etc.). If a security vulnerability is detected for the network infrastructure device, the third-party service provider (i.e., the "owner" entity) can mitigate the security vulnerability by applying a patch or the like to the firmware of the network infrastructure device.

SUMMARY

The embodiments disclosed herein provide for determining ownership for an unassigned device in a network. In particular, the embodiments provide retrieving one or more datasets to identify data items pertaining to the unassigned network device. One or more ownership identification rules are utilized to produce an output indicative of a predicted network owner identity alongside a confidence value of that output of the predicted network owner identity. The confidence value is used to decide whether the unassigned network device should be assigned to the predicted network owner entity.

In one implementation, a method is provided. The method includes identifying, by a computing system comprising one or more processors, one or more candidate data items from a plurality of data items of one or more datasets, wherein the one or more datasets are associated with one or more network devices comprising an unassigned network device that is unassigned to any network owner entity, and wherein each of the one or more candidate data items is associated with the unassigned network device. The method further includes evaluating, by the computing system, the one or more candidate data items with one or more ownership identification rules to generate an ownership identifying output, wherein the ownership identifying output comprises information indicative of a predicted network owner entity for the unassigned network device and a confidence value corresponding to the predicted network owner entity. The method further includes, based on the confidence value, causing, by the computing system, a determination to be made whether to assign the unassigned network device to the predicted network owner entity.

In another implementation, a computing system is provided. The computing system includes one or more processors, and one or more non-transitory, computer-readable media that store instructions that when executed by the one or more processors cause the computing system to perform operations. The operations include identifying, by a computing system comprising one or more processors, one or more candidate data items from a plurality of data items of one or more datasets, wherein the one or more datasets are associated with one or more network devices comprising an unassigned network device that is unassigned to any network owner entity, and wherein each of the one or more candidate data items is associated with the unassigned network device. The operations further include evaluating, by the computing system, the one or more candidate data items with one or more ownership identification rules to generate an ownership identifying output, wherein the ownership identifying output comprises information indicative of a predicted network owner entity for the unassigned network device and a confidence value corresponding to the predicted network owner entity. The operations further include, based on the confidence value, causing, by the computing system, a determination to be made whether to assign the unassigned network device to the predicted network owner entity.

In another implementation, one or more non-transitory computer-readable media are provided. The one or more non-transitory computer-readable media storage media include executable instructions that, when executed by one or more processors of a computing system, cause the computing system to perform operations. The operations include identifying, by a computing system comprising one or more processors, one or more candidate data items from a plurality of data items of one or more datasets, wherein the one or more datasets are associated with one or more network devices comprising an unassigned network device that is unassigned to any network owner entity, and wherein each of the one or more candidate data items is associated with the unassigned network device. The operations further include evaluating, by the computing system, the one or more candidate data items with one or more ownership identification rules to generate an ownership identifying output, wherein the ownership identifying output comprises information indicative of a predicted network owner entity for the unassigned network device and a confidence value corresponding to the predicted network owner entity. The operations further include, based on the confidence value, causing, by the computing system, a determination to be made whether to assign the unassigned network device to the predicted network owner entity.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
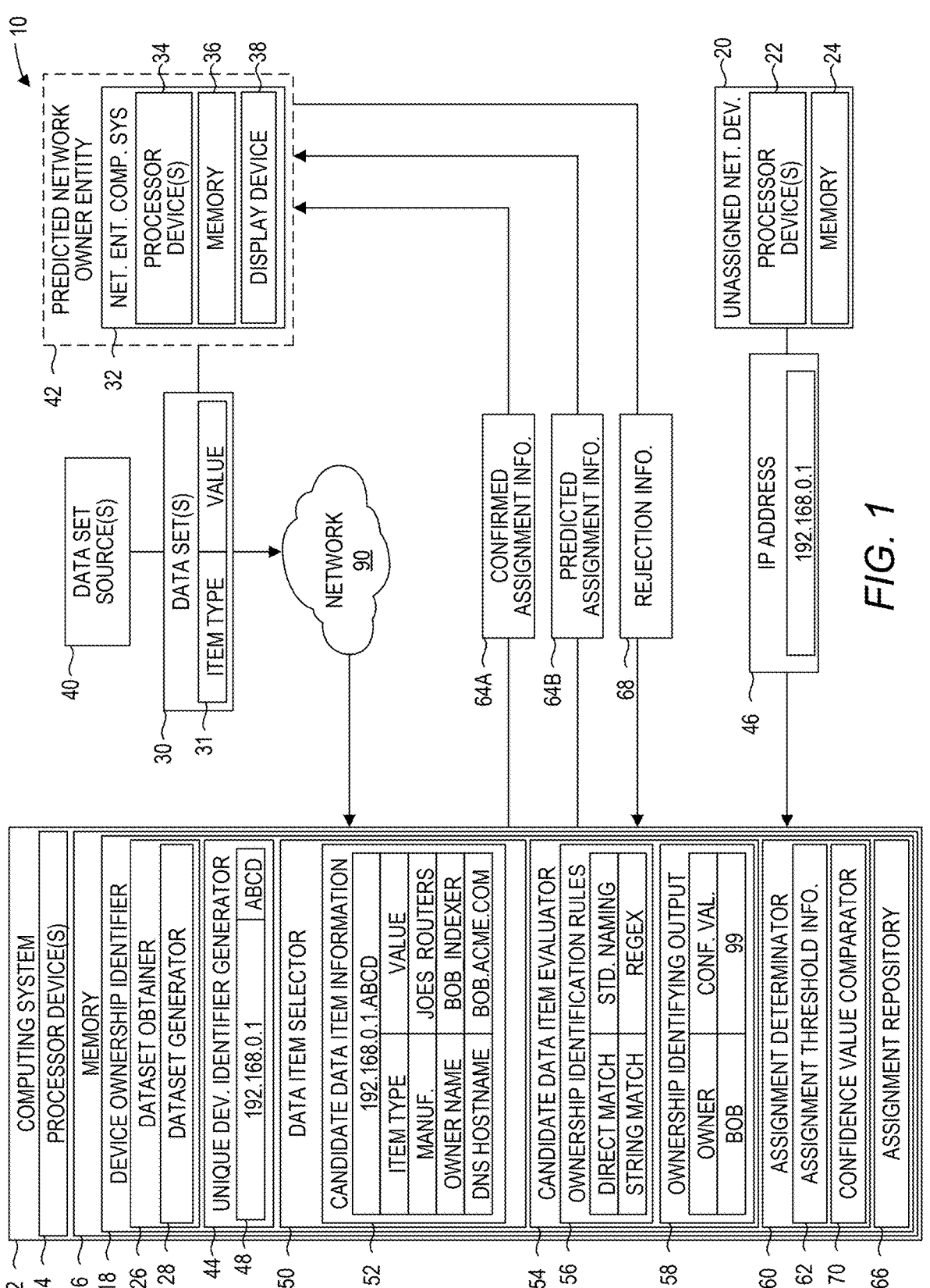
FIG. 1 is a block diagram of a computing environment for network device ownership determination according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Internet Protocol (IP)-based networks are implemented with a wide variety of network devices, such as network infrastructure devices (e.g., network routers, network switches, etc.), user devices (e.g., smartphones, laptops, etc.), user premises equipment (e.g., user routers, modems, etc.), etc. Many of the largest IP-based networks are implemented by network service providers, who use such networks to provision users with network services. For example, a network service provider such as an Internet Service Provider (ISP) may provide user-premises equipment (e.g., a modem) to a user who has subscribed to internet services provided by the ISP so that the user can receive internet service.

Network devices are often subject to security threats (e.g., remote code execution, data extraction, etc.). Once a security threat is detected, the threat can be mitigated by the entity that "owns" the network device (e.g., manufactures the device, is assigned to the device, etc.). For example, assume that a network service provider utilizes an infrastructure device (e.g., an IP-based network device) that is owned by a third-party service provider (e.g., a satellite, a base station, etc.). If a security vulnerability is detected for the network infrastructure device, the third-party service provider (i.e., the "owner" entity) can mitigate the security vulnerability by applying a patch or the like to the firmware of the network infrastructure device.

Conventional ISPs often leverage a variety of third-party entities to implement network infrastructure. For example, an ISP that wishes to expand network service offerings within a new geographic area may contract with a third-party service provider that installs network infrastructure devices (e.g., modems, routers, etc.). The third-party service provider can be responsible for initial installation and maintenance of network devices that implement the network of the ISP. Conversely, if the ISP maintains a network device installation group (i.e., a "first-party" service) within a different geographic area, the ISP may utilize that group to install and maintain network devices rather than a third-party service.

In addition, it is relatively common for conventional ISPs to acquire other ISPs. To follow the previous example, rather than contracting with a third-party service provider to install network devices within a geographic area, a conventional ISP may instead acquire another ISP operating in that geographic area. When such acquisitions occur, device ownership for each network device is transferred from the acquired ISP to the acquiring ISP. However, it is relatively common for reassignment to fail for some devices owned by the acquired ISP.

As described herein, a "network owner entity" refers to any type or manner of entity that owns a particular network device. Examples of network owner entities can include an entity assigned to maintain a device (e.g., a maintenance service, a third-party service provider, etc.), an entity that manufactured the device, etc. Similarly, as described herein, a network device can be "owned" by a network owner entity based on any previous, current, or future association between network device and the network owner entity. For example, a network owner entity may own a network device if the network owner entity has been assigned to the network device. For another example, the network owner entity may own the network device if the network owner entity manufactured the network device. For yet another example, the network owner entity may own the network device if the network device resides in a network implemented by the network owner entity (e.g., a third-party partner ISP, etc.).

As such, the network devices utilized to implement networks for network service providers are often "owned" by a wide variety of different network owner entities. However, due to the wide variety of different owners, the correct ownership of a device can be difficult to accurately determine. For example, assume that a third-party service provider that installs network infrastructure devices for an ISP is subsequently acquired by the ISP. Although acquired, the internal networks and systems of the acquired third-party service provider often remain separate from those of the ISP. Thus, it is relatively common for a network device of a network service provider to lack a clearly assigned owner entity.

When a network device lacks an assigned network owner entity, the network service provider is unable to mitigate security vulnerabilities detected for the network device. This is because many mitigations can only be applied by the network owner entity assigned to the device. In turn, network devices with security vulnerabilities that lack an assigned network owner entity generally must be replaced, as the risk of retaining a vulnerable device within the network is too great. As such, a technique to identify network owner entities for unassigned network devices is greatly desired.

Accordingly, implementations described herein propose a network device ownership determination system. For example, assume that a computing system (e.g., a network computing system, a distributed network of computing devices, etc.) associated with a network service provider routinely obtains datasets including various data items for network devices within a network associated with the network service provider. If the computing system identifies an unassigned network device within the network, the computing system can identify one or more candidate data items associated with the unassigned network device from a plurality of data items included in the datasets. Each of the candidate data items selected by the computing system can be associated with the unassigned network device, and some (or all) of the candidate data items can be indicative of a predicted network owner entity that is likely to own the network device. Examples of one or more candidate data items can include a manufacturing date, manufacturing entity, previous assignment information, configuration information, etc. As described herein, an "unassigned" network device can refer to a network device lacking any specified ownership.

The computing system can evaluate the candidate data item(s) with ownership identification rules to generate an ownership identifying output. In some implementations, the computing system can evaluate an ownership identification rule by searching each candidate data item for a network owner name. For example, if one of the candidate data items includes a device manufacturer field, the computing system can extract the name of the manufacturer from the device manufacturer field. Based on the ownership identification rules, the computing system can utilize the identity of the device manufacturer to predict a network owner entity.

Additionally, or alternatively, in some implementations, the computing system can evaluate an ownership identification rule that evaluates the location of the unassigned network device. Specifically, one (or more) of the ownership identification rules can exclude certain network owner entities from consideration based on a physical distance between the unassigned network device and locations associated with the network owner entities. For example, if the one or more candidate data item(s) (e.g., an IP address, geolocation information, etc.) indicate the unassigned network device is in the southeast, and one of the network owner entities is known to only deploy network devices to the northwest, then the computing system can eliminate that particular network owner entity from consideration.

The ownership identifying output can include information indicative of a predicted network owner entity such as the name of the predicted network owner entity. The ownership identifying output can also include a confidence value corresponding to the predicted network owner identity and/ or the rule used to obtain the ownership identifying output. As described herein, the "confidence value" can refer to the expected accuracy of the ownership identifying output of the predicted network owner entity. This confidence value, for example, may range from 1 to 10, 1 to 100, or the like.

As an example, assume that the owner identifying output is generated for a first network owner entity using an ownership identification rule with an associated confidence value of 70%. Further assume that a second owner identifying output is generated for a second network owner entity using a second ownership identification rule with a confidence value of 60%. The computing system can select the first network owner entity as the predicted network owner entity based on the ownership identification rule having the highest associated confidence value.

Based on the confidence value, the computing system can determine whether to assign the unassigned network device to the predicted network owner entity. In other words, the computing system can use the confidence value corresponding to the predicted network owner entity to make a determination as to whether the unassigned network device should be assigned to the predicted network owner entity. By way of example, the computing system may determine to assign the unassigned network device to a first network owner entity over a second network owner entity if the confidence value associated with the first network owner entity is greater than the confidence value associated with the second network owner entity. The computing system can also generate assignment information indicative of assignment of the unassigned network device to the predicted network owner entity. This assignment information can include the ownership identifying output.

The computing system can store the assignment information to an assignment repository, which includes assignment information for a plurality of network owner entities that own separate network devices. In such fashion, implementations described herein can determine network owner entities for unassigned network devices based on candidate data items data extracted from information obtained for the unassigned network device.

Aspects of the present disclosure provide a number of technical effects and benefits. As one example technical effect and benefit, security vulnerabilities that are not quickly mitigated can have disastrous consequences for network service providers (e.g., data theft, sabotage, destruction of resources, malware, ransomware, etc.). Mitigations for security vulnerabilities in a network device must be applied by the owner entity that owns the network device. However, current approaches must identify owner entities manually, which is substantially time intensive. The length of time required to manually identify owner entities substantially increases the risk that a security vulnerability is exploited by a malicious actor before it can be mitigated. Accordingly, implementations of the present disclosure can autonomously evaluate data items corresponding to the unassigned network device to determine a predicted network owner entity and assign a network owner entity to the unassigned network device. By substantially reducing the quantity of time required to determine device ownership, implementations of the present disclosure obviate the inefficiencies associated with manual searching and determination of a device owner.

FIG. 1 is a block diagram of a computing environment 10 for network device ownership determination according to some implementations of the present disclosure. More specifically, the computing environment 10 can be any type or manner of computing environment implemented by one or more different entities, such as a network service provider (e.g., an internet service provider, a telecommunications service provider, etc.). The computing environment 10 can include any type or manner of computing device, network device, network infrastructure (e.g., transceivers, splitters, cable, etc.), etc. For example, the computing environment 10 can be an environment implemented by a network service provider, and can include various devices and infrastructure that collectively enable provision of network services.

The computing environment 10 can include a computing system 12. The computing system 12 can include processor device(s) 14 and memory 16. In some implementations, the computing system 12 may be a computing system that includes multiple computing devices. Alternatively, in some implementations, the computing system 12 may be one or more computing devices within a computing environment that includes multiple distributed devices and/or systems. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 16 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory can include a device ownership identifier 18. The device ownership identifier 18 can perform various operations to identify a network owner entity for network devices within the computing environment 10 that currently lack an assignment to a particular network owner entity. In particular, the device ownership identifier 18 of the computing system 12 can identify a predicted network owner entity of an unassigned network device 20 within the computing environment 10. The unassigned network device 20 can include processor device(s) 22 and memory 24 as described with regards to the processor device(s) 14 and the memory 16 of the computing system 12. The unassigned network device 20 can be any type or manner of network device, such as network infrastructure devices (e.g., network routers, network switches, etc.), user devices (e.g., smartphones, laptops, etc.), user premises equipment (e.g., user routers, modems, etc.), or any other type of network device belonging to the IP-based network.

As described previously, the unassigned network device 20 can be a network device without an assigned network owner entity. As described herein, a "network owner entity" generally refers to some entity associated with the network service provider that implements the computing environment 10. For example, network service providers often acquire other network service providers to more efficiently provide network services to subscribers. When such acquisitions occur, network devices owned by the acquired network service provider are re-assigned to the acquiring network service provider. However, it is relatively common for re-assignment to fail for some of these network devices, thus leaving the network devices unassigned to any network owner entity. In these instances, the device ownership identifier can identify a predicted network owner for the unassigned network device 20.

The device ownership identifier 18 can include a dataset obtainer 26. The dataset obtainer 26 can obtain one or more dataset(s) 30. The one or more dataset(s) 30 can include a plurality of data items 31. Each of the data items 31 can be, or otherwise include, configuration information for network devices, routine monitoring information, etc. For example, the plurality of data items 31 within the dataset(s) 30 can include owner names associated with the network devices, Domain Name System (DNS) hostnames associated with the network devices, manufacturer names for the network devices, IP addresses for the network devices, etc.

In some implementations, the dataset obtainer 26 can include a dataset generator 28. The dataset obtainer 26 can obtain the dataset(s) 30 by generating the dataset(s) 30 with the dataset generator 28. For example, the dataset generator 28 can include software and/or hardware resources sufficient to monitor network devices such as the unassigned network device 20. The dataset generator 28 can generate the dataset(s) 30 by monitoring network devices to measure performance metrics for the network devices over time.

Additionally, or alternatively, in some implementations, the dataset(s) 30 can be obtained from a network entity computing system 32 associated with, or otherwise belonging to, a predicted network owner entity 42. As described previously, a "network owner entity" can refer to any type or manner of entity associated with the network service provider that implements the computing environment 10. In some implementations, the predicted network owner entity 42 can be the network service provider that implements the computing environment 10. Alternatively, in some implementations, the predicted network owner entity 42 can be a subsidiary of the predicted network owner entity 42, a third-party service provider contracted to or otherwise associated with the network service provider, a governmental entity, etc.

The network entity computing system 32 can include processor device(s) 34 and memory 36 as described with regards to the processor device(s) 14 and the memory 16 of the computing system 12. In some implementations, the network entity computing system 32 can also include a display device 38. In some implementations, the dataset obtainer 26 can obtain the dataset(s) 30 from the network entity computing system 32. For example, the dataset obtainer 26 can obtain the dataset(s) 30 via an Application Programming Interface (API), direct database connections, direct transfer of files in proprietary file formats (e.g., CSV, etc.), as a structured data object (e.g., a Javascript Object Notation (JSON) format, and the like.

In some implementations, the dataset(s) 30 can be obtained by the dataset obtainer 26 from one or more data set source(s) 40. The data set source(s) 40 can include a network owner entities within the computing environment 10, including network devices currently assigned to the network owner entities. For example, assume that one of the dataset source (s) 40 is a network device that implements a service used by the unassigned network device 20 (and other network devices). When various network devices (including the unassigned network device 20) interact with the network device, the network device can measure performance metrics associated with the network devices based on the interactions (e.g., IP addresses, hardware identifiers, a response time or latency, etc.). The performance metrics measured by the network device can be stored to one or more of the dataset(s) 30.

In some implementations, the unassigned network device 20 can be a virtual device implemented by a hypervisor. The one or more dataset(s) 30 can indicate a network owner entity that implements the hypervisor, runtime information and/or configuration information utilized by the hypervisor during implementation of the virtual device, etc. The dataset (s) 30 can be obtained from the hypervisor, a network device that implements the hypervisor, a network device that interacts with the hypervisor, etc.

In some implementations, the dataset obtainer 26 can continually receive the dataset(s) 30 (or updates to the dataset(s) 30). For example, if one of the dataset source(s) 40 is a network device that monitors performance of the unassigned network device 20, the dataset source(s) 40 can continuously report performance information for the unassigned network device 20 at regular intervals.

The device ownership identifier 18 can include a unique identifier generator 44. The unique identifier generator 44 can create a unique identifier for the unassigned network device 20. More specifically, it is relatively common for network devices, and unassigned network devices in particular, to lack a unique identifier. Rather, many network devices utilize identifiers that are unique within private networks (e.g., a user home network) but are non-unique outside of those private networks. For example, if the unassigned network device 20 is identified by an Internet Engineering Task Force (IETF) Request for Comments (RFC) 1918 IP address (e.g., an IP address reserved for private network use) within a private network, other network devices within the computing environment 10 that are connected to different private networks may be identified by the same IETF RFC 1918 IP address. Without a unique identifier for the unassigned network device 20, the computing system 12 may be unable to correctly extract candidate data items that are associated with the unassigned network device 20 from the data items 31.

As such, the unique identifier generator 44 can generate a unique identifier 48 for the unassigned network device 20, and can utilize the unique identifier 48 to select data items from the data items 31. For example, assume that the device ownership identifier 18 obtains a non-unique IP address 46 associated with the unassigned network device 20 (e.g., in response to a query to the unassigned network device 20, via the dataset(s) 30, etc.). The unique identifier generator 44 can generate the unique identifier 48 for the unassigned network device 20 based on the non-unique IP address 46. Alternatively, in some implementations, the unique identifier 48 can be a Universally Unique Identifier (UUID). In some implementations, the unique identifier 48 can be a combination of the IP Address 46 and a common network, which can include an autonomous system number, common language location identifier, and the like.

In some implementations, the unique identifier generator 44 can apply a unique identifier 48 to each of the one or more network devices in the IP-based network. The dataset obtainer 26 can attach the unique identifier 48 corresponding to the unassigned network device and each of the one or more devices in the IP-based network, so the one or more datasets includes the unique identifier 48 to indicate which data set belongs to which device. For example, the unique identifier 48 associated with the unassigned network device 20 can be attached to the plurality of data items in the one or more datasets to indicate which of the plurality of data items is associated with the unassigned network device 20.

The device ownership identifier 18 can include a data item selector 50. The data item selector 50 can use the unique identifier 48 to identify candidate data item(s) from the dataset(s) 30 that are associated with the unassigned network device 20. For example, the data item selector 50 can use the unique identifier 48 attached to the one or more dataset(s) 30 to identify one or more candidate data items associated with the unassigned network device 20. The identification of the one or more candidate data items includes creation of candidate data item information 52 that includes, or otherwise describes, the one or more candidate data item(s) selected with the data item selector 50. For example, the candidate data item information 52 can, for each data item, describe a type of candidate data item, a value for the candidate data item, etc. In some implementations, the candidate data item information 52 can include an owner name associated with the unassigned network device 20, a DNS hostname of the unassigned network device 20, a manufacturer of the unassigned network device 20, an IP address of the unassigned network device 20, and the like. In some implementations, unassigned network device 20 can be a virtual device implemented by a hypervisor, such that the candidate data item information 52 includes runtime information and/or configuration information utilized by the hypervisor during implementation of the virtual device. The candidate data item information 52 can also include the owner of the hypervisor.

The device ownership identifier 18 can include a candidate data item evaluator 54. The candidate data item evaluator 54 can evaluate the candidate data item information 52 to find potential owners of the unassigned network device 20. Specifically, the candidate data item evaluator 54 can evaluate the candidate data item information 52 with the ownership identification rules 56 to generate an ownership identifying output 58. The ownership identifying output 58 can identify a predicted network owner entity for the unassigned network device 20 and a corresponding confidence value. To do so, the candidate data item evaluator 54 can use one or more ownership identification rules 56 to evaluate the candidate data item information 52. As described herein, an ownership identification rule refers to a threshold value or metric, algorithm, set of instructions (e.g., software instructions, etc.), script, operations, etc. that can be used to evaluate candidate data items.

In some implementations, the ownership identification rules 56 can be configured to identify strings, keywords, phrases, data items, etc. that are known to correspond to particular network owner entities. For example, assume that the predicted network owner entity 42 is a network service provider that was acquired by the network service provider that implements the computing environment 10. Further assume that, prior to acquisition, the predicted network owner entity 42 embedded a hidden value in the configuration file for each network device owned by the network service provider. The ownership identification rules 56 can include a rule configured to identify candidate data items that include the hidden value (e.g., using a regular expression (REGEX), etc.).

In some implementations, a confidence value can be associated with each of the ownership identification rules 56. The confidence values can indicate a probability that a predicted network owner entity identified using a corresponding rule is the correct network owner entity. To follow the previous example, if the acquired network owner entity is the only network owner entity that embeds the hidden value in the configuration information of network devices, the confidence value associated with that ownership identification rule may be greater than 90%. Alternatively, if the acquired network owner entity is one of multiple network owner entities that embed hidden values in the configuration information of network devices, the confidence value associated with that ownership identification rule may be less than 90%.

In some implementations, confidence values associated with the ownership identification rules 56 can be modified based on the accuracy of ownership identifying outputs generated using the ownership identification rules 56. For example, assume that one of the ownership identification rules 56 with a confidence value of 90% is used to identify a predicted network owner entity. If the predicted network owner entity indicates that the prediction is incorrect (i.e., that the network owner entity does not actually own the unassigned network device 20), the device ownership identifier 18 can decrease the confidence value.

In some implementations, the ownership identification rules 56 can be utilized to exclude certain network owner entities or types of network owner entities. For example, a first rule of the ownership identification rules 56 can identify a geographic region for the unassigned network device 20 (e.g., based on the device IP address, geolocation information, historical device deployment information, etc.). Based on the geographic region for the unassigned network device 20, the candidate data item evaluator 54 can exclude a number of subsequent ownership identification rules that are associated with network owner entities that do not, and have not, operated in the particular geographic region. As such, the ownership identification rules 56 can be structured hierarchically or sequentially to efficiently reduce the search space during evaluation of the ownership identification rules 56. As another example, the ownership identification rules 56 can first identify an owner name for the unassigned network device 20 (e.g., based on an owner name data item). Based on the owner name for the unassigned network device 20, the candidate data item evaluator 54 can use the owner name as conclusory evidence of the predicted network owner entity 42.

In some implementations, a confidence value can be an average of all ownership identification rules 56 used to evaluate the candidate data item information 52. For example, a first rule of the ownership identification rules 56 may have a confidence value of 70% for indicating ownership of the unassigned network device, and a second rule of the ownership identification rules 56 may have a confidence value of 90% for indicating ownership of the unassigned network device 20. Accordingly, the candidate data item evaluator 54 can average these confidence values to yield a confidence value of 80%.

Additionally, or alternatively, in some implementations, the candidate data item evaluator 54 can weigh a contribution of each of the ownership identification rules 56 when averaging their confidence values for the same predicted network owner entity. For example, a first rule of the ownership identification rules 56 can identify a network owner entity for the unassigned network device 20 with a confidence value of 90%, and a second rule of the ownership identification rules 56 can identify the same owner entity with a confidence value of 70%. In this example, the candidate data item evaluator 54 can generate an average confidence value of 85%.

The candidate data item evaluator 54 can evaluate the ownership identification rules 56 to generate the ownership identifying output 58. The ownership identifying output 58 can identify the predicted network owner entity 42. In some implementations, the ownership identifying output 58 can include a confidence value corresponding to the accuracy of the determination by the candidate data item evaluator 54 that the predicted network owner entity 42 is the owner of the unassigned network device 20. This confidence value, for example, may range from 1 to 10, 1 to 100, or the like.

In some implementations, the candidate data item evaluator 54 can evaluate the one or more candidate data items using the one or more ownership identification rules 56 as described previously to produce a second ownership identifying output. The second ownership identifying output can include the name of a second predicted network owner entity and a second confidence value corresponding to the accuracy of the determination by the candidate data item evaluator 54 that the second predicted owner entity is the owner of the unassigned network device 20. Alternatively, in some implementations, the ownership identifying output can identify multiple predicted network owner entities, and can include a confidence value for each of the predicted network owner entities. One of ordinary skill in the art will appreciate that the candidate data item evaluator 54 can perform evaluations for a plurality of predicted network owner entities for the computing system 12 to determine ownership of the unassigned network device 20.

The device ownership identifier 18 can include an assignment determinator 60. The assignment determinator 60 can determine whether to assign the unassigned network device 20 to the predicted network owner entity 42 based on the confidence value corresponding to the predicted network owner entity 42. In some implementations, the assignment determinator 60 can determine to assign the unassigned network device 20 to the predicted network owner entity 42. Responsive to determining to assign the unassigned network device 20 to the predicted network owner entity 42, the assignment determinator 60 can generate either confirmed assignment information 64A or predicted assignment information 64B (generally, predicted assignment information 64) indicative of the assignment of the unassigned network device 20 to the predicted network owner entity 42. In some implementations, the device ownership identifier 18 can store the generated assignment information into an assignment repository 66. The assignment repository 66 can include assignment information for a plurality of other network owner entities in the IP-based network.

In some implementations, the assignment determinator 60 can include assignment threshold information 62. The assignment threshold information 62 can include or otherwise describe an automatic assignment threshold. If the confidence value of the ownership identifying output 58 is greater than the automatic assignment threshold, the assignment determinator 60 can automatically assign the unassigned network device 20 to the predicted network owner entity 42. The assignment threshold information 62 can also include an ownership query threshold. If the confidence value of the ownership identifying output 58 is less than the automatic assignment threshold and greater than the ownership query threshold, the assignment determinator can query the predicted network owner entity to determine whether the predicted network owner entity 42 owns the unassigned network device 20.

For example, if the confidence value is greater than the ownership query threshold and the automatic assignment threshold, then the assignment determinator 60 can generate confirmed assignment information 64A to automatically assign the unassigned network device 20 to the predicted network owner entity 42. The computing system 12 can send the confirmed assignment information 64A to the network entity computing system 32 associated with the predicted network owner entity 42 to inform the predicted network owner entity 42 of the automatic assignment. For example, the confirmed assignment information 64A can be displayed as a notification on the display device 38 of the network entity computing system 32 belonging to the predicted network owner entity.

In some implementations, the confirmed assignment information 64A can include a modification policy that restricts modification of the confirmed assignment information 64A. More specifically, because the confidence value exceeds the automatic assignment threshold, the assignment determinator 60 can be relatively certain that the unassigned network device 20 is owned by the predicted network owner entity 42. Because of this certainty, the assignment determinator can restrict modification of the confirmed assignment information 64A by other parties, such as the predicted network owner entity 42.

As another example, if the confidence value is greater than the ownership query threshold but less than the automatic assignment threshold, then the assignment determinator 60 can generate predicted assignment information 64B that assigns the unassigned network device 20 to the predicted network owner entity 42. The computing system 12 can send the predicted assignment information 64B to the network entity computing system 32 associated with the predicted network owner entity 42. Unlike the confirmed assignment information 64A, which is primarily provided to the network entity computing system 32 to inform the predicted network owner entity 42 of the assignment, the predicted assignment information 64B can serve to query the predicted network owner entity 42 as to whether the predicted network owner entity 42 owns the unassigned network device 20.

For example, the predicted assignment information 64B can be displayed as a notification on the display device 38 of the network entity computing system 32 belonging to the predicted network owner entity. A user of the network entity computing system 32 can interact with the notification to confirm or reject the assignment of the unassigned network device 20 to the predicted network owner entity 42. In some implementations, if the predicted assignment information 64B is rejected, the computing system 12 can receive rejection information 68 from the predicted network owner entity 42 indicating that the predicted network owner entity 42 rejects the assignment of the unassigned network device 20. In some implementations, upon receiving the rejection information 68, the assignment determinator can modify the predicted assignment information 64B to remove assignment of the unassigned network device 20 to the predicted network owner entity 42. In some implementations, the predicted assignment information 64B can include instructions that instruct the predicted network owner entity 42 to determine whether the predicted network owner entity 42 owns the unassigned network device 20, which can include the predicted network owner entity subsequently sending the rejection information 68. In some implementations, receiving the rejection information 68 by the predicted network owner entity 42 can cause the assignment determinator 60 to generate assignment information that assigns the unassigned network device 20 to a second predicted network owner entity (not illustrated).

In some implementations, the assignment determinator 60 can include a confidence value comparator 70 to compare the confidence value corresponding to the predicted network owner entity 42 to the second confidence value corresponding to the second predicted network owner entity. The confidence value comparator 70 can determine that the confidence value corresponding to the predicted network owner entity 42 is greater than the second confidence value corresponding to the second predicted network owner entity. The assignment determinator 60 can use this determination to generate assignment information indicating assignment of the unassigned network device 20 to the predicted network owner entity 42. Likewise, the confidence value comparator 70 can determine that the second confidence value corresponding to the second predicted network owner entity is greater than the confidence value corresponding to the predicted network owner entity 42, thereby causing the assignment determinator 60 to generate information indicative of assignment of the unassigned network device 20 to the second predicted network owner entity.

As another example, if the assignment determinator 60 determines that the confidence value for the predicted network owner entity 42 is greater than an automatic assignment threshold, and that the second confidence value for the second predicted network owner entity is less than the automatic assignment threshold value, then the assignment determinator 60 can generate confirmed assignment information that assigns the unassigned network device 20 to the predicted network owner entity 42. In some embodiments, if both the confidence value for the predicted network owner entity and the second confidence value for the second predicted network owner entity are above an automatic assignment threshold, the assignment determinator can use the higher of the two confidence values for assignment. If the confidence values are equal, the assignment determinator 60 can generate predicted assignment information 64B to assign the unassigned network device 20 to either the predicted network owner entity 42 or the second network owner entity based on some other criteria (e.g., a random value, permissions associated with each entity, a length and/or degree of association between the entities and the network service provider that implements the computing environment 10, etc.). This predicted assignment information 64B can be sent to the respective predicted network owner entity. The computing system 12 can then receive rejection information 68 as previously described to remove the assignment, and then assign the unassigned network device to the other predicted network owner entity. This assignment can be stored in the assignment repository 66.

In some implementations, the assignment determinator can use the assignment threshold information 62 as described to determine whether the greater of the two confidence values should be used to generate confirmed assignment information 64A or predicted assignment information 64B. For example, if the confidence value for the predicted network owner entity 42 is greater than the second confidence for the second predicted network owner entity and is greater than the ownership query threshold but less than the automatic assignment threshold, then predicted assignment information 64B will be generated. This predicted assignment information 64B can be sent to the network entity computing system 32 belonging to the predicted network owner entity 42. The computing system 12 can receive rejection information 68 as previously described to remove the assignment. As another example, if the confidence value for the predicted network owner entity 42 is greater than the second confidence for the second predicted network owner entity and is greater than the ownership query threshold the automatic assignment threshold, then the assignment determinator 60 can generate confirmed assignment information 64A. The computing system 12 can send the confirmed assignment information 64A to the predicted network owner entity 42 to be displayed as a notification on the display device 38 of the network entity computing system 32 belonging to the predicted network owner entity 42. The confirmed assignment information 64A can include a modification policy that restricts modification of the confirmed assignment information 64A. This assignment information can be stored into the assignment repository 69.

Because the device ownership identifier 18 is a component of the computing system 12, functionality implemented by the device ownership identifier 18 may be attributed to the computing system 12 generally. Moreover, in examples where the device ownership identifier 18 comprises software instructions that program the processor device(s) 14 to carry out functionality discussed herein, functionality implemented by the device ownership identifier 18 may be attributed herein to the processor device(s) 14.

Figure 2:
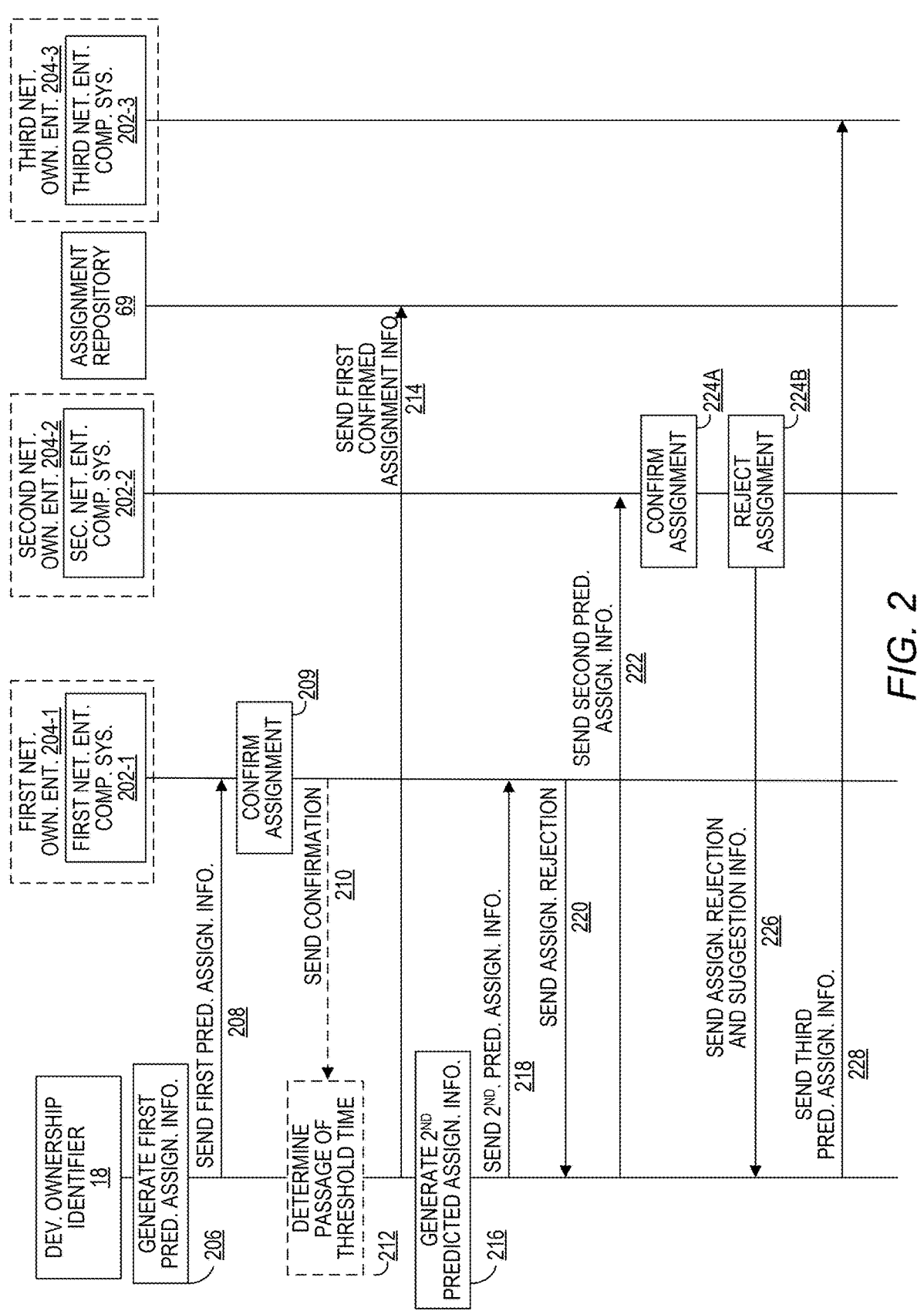
FIG. 2 is a communication flow diagram for network device ownership determination between multiple network owner entities according to some implementations of the present disclosure.

FIG. 2 is a communication flow diagram for network device ownership determination between multiple network owner entities according to some implementations of the present disclosure. FIG. 2 will be discussed in conjunction with FIG. 1. More specifically, the device ownership identifier 18 can identify candidate data items from datasets associated with a first unassigned network device as described with regards to FIG. 1. The device ownership identifier 18 can then predict a predicted network owner entity for the first unassigned network device. To do so, the device ownership identifier 18 can communicate with a first network entity computing system 202-1 associated with a first network owner entity 204-1, a second network entity computing system 202-2 associated with a second network owner entity 204-2, and in some implementations, a third network entity computing system 202-3 associated with a third network owner entity 204-3.

Specifically, at 206, the device ownership identifier can generate first predicted assignment information for the first unassigned network device (e.g., the predicted assignment information 64 for the unassigned network device 20 as described with regards to FIG. 1). The first predicted assignment information can identify the first network owner entity 204-1 as the predicted network owner entity for the first unassigned network device. For example, the device ownership identifier 18 can evaluate candidate data items from datasets associated with the first unassigned network device to generate the predicted assignment information that identifies the first network owner entity 204-1.

At 208, the device ownership identifier 18 can provide the first predicted assignment information to the first network entity computing system 202-1 associated with the first network owner entity 204-1. At 209, the first network entity computing system 202-1 can confirm assignment of the first unassigned network device indicated by the first predicted assignment information. For example, if the first predicted assignment information 208 includes an identifier for the first unassigned network device, the first network entity computing system 202-1 can search for the identifier in a list of device identifiers maintained by the first network owner entity 204-1.

In some implementations, the first predicted assignment information can include a confidence value. If the confidence value is greater than a threshold confirmation value (e.g., 90%, etc.), the device ownership identifier 18 can assign the first unassigned network device to the first network owner entity 204-1 without receiving confirmation of ownership or assignment from the first network owner entity 204-1. In this instance, the first network entity computing system 202-1 does not need to respond for assignment to occur.

Alternatively, in some implementations, the confidence value can be below an automatic assignment or confirmation threshold. In response, at 210, in some implementations the first network entity computing system 202-1 can provide confirmed assignment information to the device ownership identifier 18 that confirms ownership of the first unassigned network device. Alternatively, at 212, if the first network owner entity computing system 202-1 does not send the ownership confirmation at 210, the device ownership identifier 18 can assign the first unassigned network device to the first network owner entity 204-1 after determining that a certain period of time has passed since the first predicted assignment information was sent to the first network entity computing system 202-1 at 210.

Following 208, 210, and/or 212, at 214, the device ownership identifier 18 can send first confirmed assignment information to the assignment repository 69. The assignment repository 69 can store the first confirmed assignment information such that assignment of the first unassigned network device to the first network owner entity 204-1 is completed.

At 216, the device ownership identifier 18 can generate second predicted assignment information for a second unassigned network device. At 218, the device ownership identifier 18 can send the second predicted assignment information to the first network entity computing system 202-1.

At 220, the first network entity computing system 202-1 can send assignment rejection information to the device ownership identifier indicating that the first network owner entity 204-1 does not own the second unassigned network device. For example, assume that the second predicted assignment information includes a confidence value that is below an automatic assignment threshold. As such, the second predicted assignment information can request that the first network owner entity 204-1 confirm or deny assignment of the second network device. The first network owner entity 204-1 can perform the same process as described with regards to operation 209 to determine that the second unassigned network device should be assigned to some other network owner entity.

In response, at 222, the device ownership identifier 18 can transmit the second predicted assignment information to the second network entity computing system 202-2. More specifically, in some implementations, the second predicted assignment information can include or otherwise indicate a plurality of predicted network owner entities that are ranked in accordance with the confidence values. If the device ownership identifier 18 receives an assignment rejection from the most likely network owner entity, the device ownership identifier 18 can send the predicted assignment information to the next most likely owner entity.

At 224, the second network entity computing system 202-2 can confirm or reject assignment of the second unassigned network device. In some implementations, at 224A the second network entity computing system 202-2 can confirm assignment of the unassigned network device. The second network entity computing system 202-2 can then send confirmation information to the device ownership identifier 18 to confirm assignment of the unassigned network device.

Alternatively, in some implementations, at 224B the second network entity computing system 202-2 can reject the assignment of the unassigned network device. Once rejected, the second network entity computing system 202-2 can communicate the rejection to the device ownership identifier 18 by sending assignment rejection information to the device ownership identifier 18.

In some implementations, at 226, the second network entity computing system 202-2 can include suggestion information alongside the assignment rejection information. The suggestion information can suggest a network owner entity different than the network owner entities identified via operations 206 and 216. In other words, the suggested network owner entity can be an owner entity that was not previously evaluated (e.g., by the candidate data item evaluator 54 of FIG. 1, etc.). For example, the second network entity computing system 202-2 may have access to information unavailable to the device ownership identifier 18 (e.g., internal documentation, historical transactions or records, etc.) indicating an identity of the owner of the unassigned network device.

In some implementations, the suggestion information can indicate an identity of the suggested network owner entity. The device ownership identifier 18 can then evaluate the suggested network owner entity by generating a confidence value as described previously. Alternatively, in some implementations, the third network entity computing system 202-3 can include a confidence value with the suggestion information. The confidence value can be determined as described with regards to the ownership identifying output 58 of FIG. 1. Alternatively, in some implementations, the third network entity computing system 202-3 can include instructions alongside the suggestion information. The instructions can instruct the device ownership identifier 18 to override all previous confidence scores and/or automatically confirm assignment of the unassigned device to the third network owner entity 204-3. In some implementations, the suggestion information can be, or otherwise include, candidate data items for the suggested network owner entity.

To follow the illustrated example, the suggestion information provided to the device ownership identifier 18 at 226 can indicate the third network owner entity 204-3 associated with the third network entity computing system 202-3. Based on the suggestion information, at 228 the device ownership identifier 18 can send third predicted assignment information to the third network entity computing system 202-3, and the third network entity computing system 202-3 can confirm or reject the assignment of the unassigned network device.

At 226, the second network entity computing system 202-2 can send a confirmation to the device ownership identifier 18 that confirms ownership of the second unassigned network device. In such fashion, the device ownership identifier 18 can iteratively evaluate candidate network owner entities until the correct entity is identified.

Figure 3:
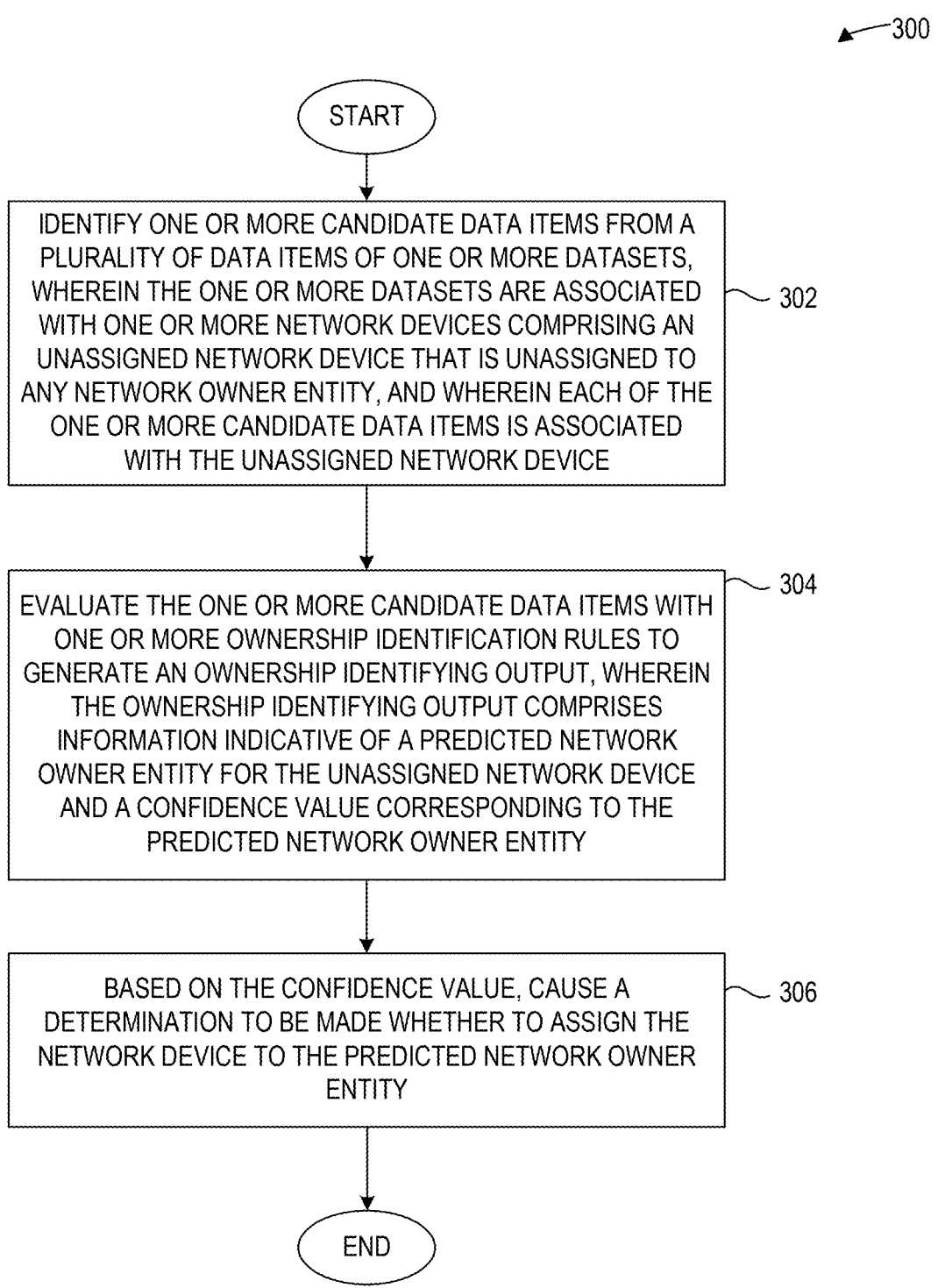
FIG. 3 is a flowchart diagram for a method for identifying ownership of unassigned network devices according to some implementations of the present disclosure.

FIG. 3 is a flowchart diagram for a method 300 for identifying ownership of unassigned network devices according to some implementations of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can identify one or more candidate data items from a plurality of data items of one or more datasets. The one or more datasets can be associated with one or more network devices. The network device(s) can include an unassigned network device that is unassigned to any network owner entity. Each of the candidate data items can be associated with the unassigned network device. In some implementations, the one or more candidate data items can include at least one of an owner name, a DNS hostname, a manufacturer of the unassigned network device, or an IP address of the unassigned network device. In some implementations, the unassigned network device can be a virtual device implemented by a hypervisor, and the one or more candidate data items can include runtime information and/or configuration information utilized by the hypervisor during implementation of the virtual device.

At 304, the computing system can evaluate the one or more candidate data items with one or more ownership identification rules to generate an ownership identifying output. The ownership identifying output can include information indicative of a predicted network owner entity for the unassigned network device and a confidence value corresponding to the predicted network owner entity.

At 306, the computing system can, based on the confidence value, cause a determination to be made whether to assign the unassigned network device to the predicted network owner entity. In some implementations, prior to causing the determination to be made, the computing system can identify one or more second candidate data items from a plurality of second data items of one or more second datasets. The one or more second datasets can be associated with the one or more network devices. Each of the second candidate data items can be associated with the unassigned network device. The computing system can evaluate the one or more second candidate data items with the one or more ownership identification rules to generate a second ownership identifying output. The second ownership identifying output can include information indicative of a second predicted network owner entity for the unassigned network device and a second confidence value corresponding to the second predicted network owner entity.

In some implementations, to cause the determination to be made whether to assign the unassigned network device to the predicted network owner entity based on the confidence value, the computing system can determine that the confidence value is greater than the second confidence value. In some implementations, the one or more second datasets can include at least one of the one or more datasets.

In some implementations, to cause the determination to be made whether to assign the unassigned network device to the predicted network owner entity based on the confidence value, the computing system can determine that the confidence value for the predicted network owner entity is greater than an automatic assignment threshold value. The computing system can also determine that the second confidence value for the second predicted network owner entity is less than the automatic assignment threshold value. The computing system can automatically cause generation of confirmed assignment information that assigns the unassigned network device to the predicted network owner entity.

In some implementations, the confirmed assignment information can include a modification policy that restricts network owner entities from modifying the confirmed assignment information. For example, the modification policy may restrict access permissions of entities other than the computing system such that those entities are unable to modify the confirmed assignment information to reject or confirm assignment of a network device.

In some implementations, to cause the determination to be made whether to assign the unassigned network device to the predicted network owner entity based on the confidence value, the computing system can make a determination that the confidence value for the predicted network owner entity is less than an automatic assignment threshold and an ownership query threshold. Responsive to the determination, the computing system can cause generation of predicted network owner entity information that prevents the predicted network owner entity from being assigned ownership of the unassigned network device.

In some implementations, to cause the determination to be made whether to assign the unassigned network device to the predicted network owner entity based on the confidence value, the computing system can determine that the confidence value for the predicted network owner entity is less than an automatic assignment threshold. The computing system can determine that the confidence value for the predicted network owner entity is greater than an ownership query threshold. The computing system can cause generation of predicted assignment information that assigns the unassigned network device to the predicted network owner entity.

In some implementations, the computing system can receive, from a computing device associated with the predicted network owner entity, information indicating rejection of the predicted assignment information of the unassigned network device to the predicted network owner entity. Responsive to receiving information indicating rejection, the computing system can modify the predicted assignment information to remove assignment of the unassigned network device to the predicted network owner entity.

In some implementations, the computing system can cause display of a notification at a display device associated with the predicted network owner entity. The notification can be indicative of assignment of the unassigned network device to the predicted network owner entity. In some implementations, to cause the determination to be made, the computing system can determine whether to assign the unassigned network device to the predicted network owner entity by determining to assign the unassigned network device to the predicted network owner entity. The computing system can, responsive to determining to assign the unassigned network device to the predicted network owner entity, generate assignment information indicative of assignment of the unassigned network device to the predicted network owner entity.

In some implementations, the computing system can provide, to a computing device associated with the predicted network owner entity, information comprising instructions that instruct the predicted network owner entity to determine whether the predicted network owner entity owns the unassigned network device.

In some implementations, the computing system can store the assignment information indicative of assignment of the unassigned network device to the predicted network owner entity to an assignment repository comprising assignment information for a plurality of network owner entities.

In some implementations, the one or more network devices can include one or more assigned network devices that are assigned to one or more respective other network owner entities different than the network owner entity. The one or more datasets can be associated with the unassigned network device and the one or more assigned network devices.

Figure 4:
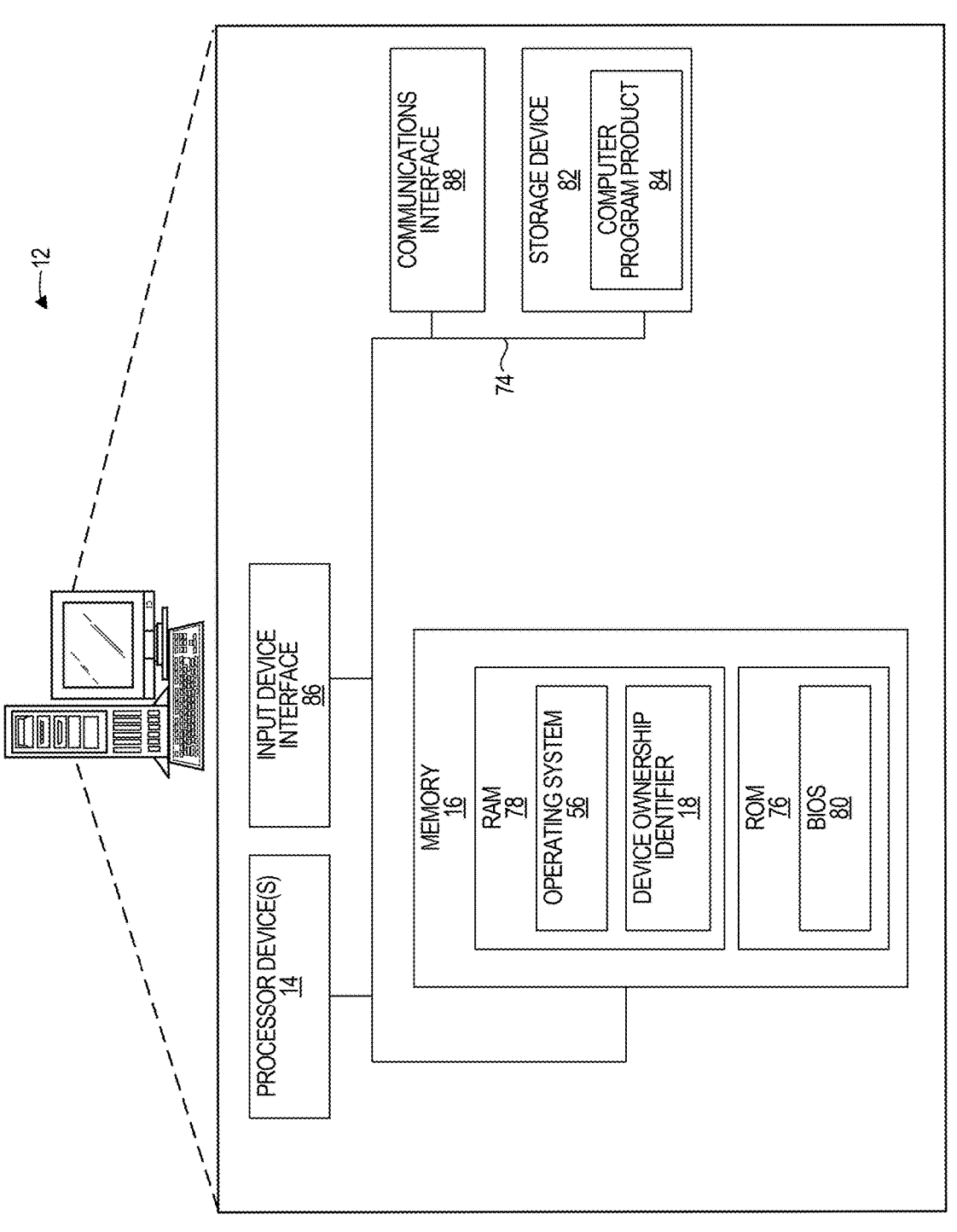
FIG. 4 is a block diagram of the computing system suitable for implementing examples according to one example.

FIG. 4 is a block diagram of the computing system 12 suitable for implementing examples according to one example. The computing system 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 12 includes the processor device(s) 14, the memory 16, and a system bus 74. The system bus 74 provides an interface for system components including, but not limited to, the memory 16 and the processor device(s) 14. The processor device(s) 14 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 16 may include non-volatile memory 76 (e.g., read-only memory (ROM), erasable programmable read-only memory (EPROM), electrically erasable programmable read-only memory (EE-PROM), etc.), and volatile memory 78 (e.g., random-access memory (RAM)). A basic input/output system (BIOS) 80 may be stored in the non-volatile memory 76 and can include the basic routines that help to transfer information between elements within the computing system 12. The volatile memory 78 may also include a high-speed RAM, such as static RAM, for caching data.

The computing system 12 may further include or be coupled to a non-transitory computer-readable storage medium such as the storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like.

A number of modules can be stored in the storage device 82 and in the volatile memory 78, including an operating system and one or more program modules, such as the device ownership identifier 18, which may implement the functionality described herein in whole or in part. All or a portion of the examples may be implemented as a computer program product 84 stored on a transitory or non-transitory computer-usable or computer-readable storage medium, such as the storage device 82, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the device ownership identifier 18 in the volatile memory 78, may serve as a controller, or control system, for the computing system 12 that is to implement the functionality described herein.

Because the device ownership identifier 18 is a component of the computing system 12, functionality implemented by the device ownership identifier 18 may be attributed to the computing system 12 generally. Moreover, in examples where the device ownership identifier 18 comprises software instructions that program the processor device(s) 14 to carry out functionality discussed herein, functionality implemented by the device ownership identifier 18 may be attributed herein to the processor device(s) 14.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 86 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like. The computing system 12 may also include the communications interface 88 suitable for communicating with the network 90 as appropriate or desired. The computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

identifying, by a computing system comprising one or more processors, one or more first candidate data items from a plurality of first data items of one or more first datasets, wherein the one or more first datasets are associated with one or more network devices comprising an unassigned network device that is unassigned to any network owner entity, and wherein each of the first candidate data items is associated with the unassigned network device;

evaluating, by the computing system, the one or more first candidate data items with one or more ownership identification rules to generate a first ownership identifying output, wherein the first ownership identifying output comprises information indicative of a first predicted network owner entity for the unassigned network device and a first confidence value corresponding to the first predicted network owner entity; and based on the confidence value, causing, by the computing system, a determination to be made whether to assign the unassigned network device to the first predicted network owner entity.

2. The method of claim 1, further comprising, prior to causing the determination to be made whether to assign the unassigned networked device to the first predicted network owner entity:

identifying, by the computing system, one or more second candidate data items from a plurality of second data items of one or more second datasets, wherein the one or more second datasets are associated with the one or more network devices, and wherein each of the second candidate data items is associated with the unassigned network device; and evaluating, by the computing system, the one or more second candidate data items with the one or more ownership identification rules to generate a second ownership identifying output, wherein the second ownership identifying output comprises information indicative of a second predicted network owner entity for the unassigned network device and a second confidence value corresponding to the second predicted network owner entity.

3. The method of claim 2, wherein causing the determination to be made whether to assign the unassigned network device to the first predicted network owner entity based on the first confidence value comprises:

determining, by the computing system, that the first confidence value is greater than the second confidence value.

4. The method of claim 2, wherein the one or more second datasets comprises at least one of the one or more first datasets.

5. The method of claim 2, wherein causing the determination to be made comprises:

determining, by the computing system, that the first confidence value for the first predicted network owner entity is greater than an automatic assignment threshold value, and that the second confidence value for the second predicted network owner entity is less than the automatic assignment threshold value; and automatically causing, by the computing system, generation of confirmed assignment information that assigns the unassigned network device to the first predicted network owner entity.

6. The method of claim 5, wherein the confirmed assignment information comprises a modification policy that restricts network owner entities from modifying the confirmed assignment information.

7. The method of claim 2, wherein causing the determination to be made comprises:

making, by the computing system, a determination that the first confidence value for the first predicted network owner entity is less than an automatic assignment threshold and an ownership query threshold; and responsive to the determination, causing, by the computing system, generation of predicted network owner entity information that prevents the first predicted network owner entity from being assigned ownership of the unassigned network device.

8. The method of claim 1, wherein causing the determination to be made comprises:

determining, by the computing system, that the first confidence value for the first predicted network owner entity is less than an automatic assignment threshold;

determining, by the computing system, that the first confidence value for the first predicted network owner entity is greater than an ownership query threshold; and causing, by the computing system, generation of predicted assignment information that assigns the unassigned network device to the first predicted network owner entity.

9. The method of claim 8, further comprising:

receiving, by the computing system from a computing device associated with the first predicted network owner entity, information indicating rejection of the predicted assignment information of the unassigned network device to the first predicted network owner entity; and responsive to receiving the information indicating rejection, modifying, by the computing system, the predicted assignment information to remove assignment of the unassigned network device to the first predicted network owner entity.

10. The method of claim 9, wherein the information indicating rejection of the predicted assignment information further comprises suggestion information indicative of a suggested network owner entity different than the first predicted network owner entity; and wherein the method further comprises:

causing, by the computing system, generation of suggested assignment information that assigns the unassigned network device to the suggested network owner entity.

11. The method of claim 1, wherein the one or more first candidate data items comprises at least one of:

an owner name;

a Domain Name System (DNS) hostname;

a manufacturer of the unassigned network device; and an internet protocol (IP) address of the unassigned network device.

12. The method of claim 11, wherein the unassigned network device is a virtual device implemented by a hypervisor; and wherein the one or more first candidate data items comprises runtime information and/or configuration information utilized by the hypervisor during implementation of the virtual device.

13. The method of claim 1, further comprising:

causing, by the computing system, display of a notification at a display device associated with the first predicted network owner entity, wherein the notification is indicative of assignment of the unassigned network device to the first predicted network owner entity.

14. The method of claim 1, further comprising:

providing, by the computing system to a computing device associated with the first predicted network owner entity, information comprising instructions that instruct the first predicted network owner entity to determine whether the first predicted network owner entity owns the unassigned network device.

15. The method of claim 1, wherein causing the determination to be made comprises:

determining, by the computing system, whether to assign the unassigned network device to the first predicted network owner entity.

16. The method of claim 15, wherein determining whether to assign the unassigned network device comprises:

determining, by the computing system, to assign the unassigned network device to the first predicted network owner entity; and responsive to determining to assign the unassigned network device to the first predicted network owner entity, generating, by the computing system, assignment information indicative of assignment of the unassigned network device to the first predicted network owner entity.

17. The method of claim 16, wherein the method further comprises:

storing, by the computing system, the assignment information indicative of the assignment of the unassigned network device to the first predicted network owner entity to an assignment repository comprising assignment information for a plurality of network owner entities.

18. The method of claim 1, wherein the one or more network devices comprise one or more assigned network devices that are assigned to one or more respective other network owner entities different than the first predicted network owner entity; and wherein the one or more datasets are associated with the unassigned network device and the one or more assigned network devices.

19. A computing system, comprising:

one or more processors; and one or more non-transitory, computer-readable media that store instructions that, when executed by the one or more processors, cause the computing system to:

identify one or more first candidate data items from a plurality of first data items of one or more first datasets, wherein the one or more first datasets are associated with one or more network devices comprising an unassigned network device that is unassigned to any network owner entity, and wherein each of the first candidate data items is associated with the unassigned network device;

evaluate the one or more first candidate data items with one or more ownership identification rules to generate a first ownership identifying output, wherein the first ownership identifying output comprises information indicative of a first predicted network owner entity for the unassigned network device and a first confidence value corresponding to the first predicted network owner entity; and based on the confidence value, cause a first determination to be made whether to assign the unassigned network device to the first predicted network owner entity.

20. One or more non-transitory computer-readable media that store instructions that, when executed by one or more processors of a computing system, cause the one or more processors to:

identify one or more first candidate data items from a plurality of first data items of one or more first datasets, wherein the one or more first datasets are associated with one or more network devices comprising an unassigned network device that is unassigned to any network owner entity, and wherein each of the first candidate data items is associated with the unassigned network device;

evaluate the one or more first candidate data items with one or more ownership identification rules to generate a first ownership identifying output, wherein the first ownership identifying output comprises information indicative of a first predicted network owner entity for the unassigned network device and a first confidence value corresponding to the first predicted network owner entity; and based on the confidence value, cause a first determination to be made whether to assign the unassigned network device to the first predicted network owner entity.

* * * * *